(12) United States Patent　　　(10) Patent No.:　　US 9,137,401 B2
Kawakami et al.　　　(45) Date of Patent:　　Sep. 15, 2015

(54) ELECTRONIC APPARATUS CAPABLE OF CHANGING CONTENT DISPLAY LANGUAGE AND DISPLAY PROGRAM

(71) Applicant: Kyocera Document Solutions Inc., Osaka (JP)

(72) Inventors: Satoshi Kawakami, Osaka (JP); Wataru Endo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 28 days.

(21) Appl. No.: 14/141,598

(22) Filed: Dec. 27, 2013

(65) Prior Publication Data

US 2014/0185095 A1　　Jul. 3, 2014

(30) Foreign Application Priority Data

Dec. 28, 2012　(JP) ................................ 2012-288192

(51) Int. Cl.
　　*G06F 15/00*　　(2006.01)
　　*H04N 1/00*　　(2006.01)
　　*G06F 3/00*　　(2006.01)

(52) U.S. Cl.
　　CPC .............. *H04N 1/00498* (2013.01); *G06F 3/00* (2013.01); *H04N 1/00411* (2013.01); *H04N 1/00413* (2013.01); *H04N 2201/0094* (2013.01)

(58) Field of Classification Search
　　None
　　See application file for complete search history.

(56) References Cited

U.S. PATENT DOCUMENTS

| 2009/0269096 A1* | 10/2009 | Mitsubori et al. | 399/81 |
| 2011/0058189 A1* | 3/2011 | Kuwamura | 358/1.9 |
| 2011/0157046 A1* | 6/2011 | Lee et al. | 345/173 |
| 2012/0086663 A1* | 4/2012 | Matsuo | 345/173 |
| 2013/0041696 A1* | 2/2013 | Richard | 705/5 |
| 2013/0212602 A1* | 8/2013 | Yamazaki | 719/321 |

FOREIGN PATENT DOCUMENTS

| JP | 2002254775 | 9/2002 |
| JP | 2003-345325 | 12/2003 |
| JP | 2005205598 | 8/2005 |
| JP | 2011-107823 | 6/2011 |

OTHER PUBLICATIONS

Japanese Office Action for Application No. 2012-288192, dated Mar. 17, 2015, 4 pages.

* cited by examiner

*Primary Examiner* — Helen Q Zong
(74) *Attorney, Agent, or Firm* — K&L Gates LLP

(57) ABSTRACT

An electronic apparatus includes: a touch panel, a content storage unit that stores content to be displayed on the touch panel in different languages; a selected language storage unit that stores a selected language; a content display unit that displays, on the touch panel, content in the selected language stored in the selected language storage unit, from pieces of content stored in the content storage unit in the languages; and a language setting unit that displays a language selection screen on the touch panel if a particular operation is accepted in a non-explicit area, which is not explicitly indicated as being ready for accepting an operation, the language selection screen being one of screens displayed on the touch panel, and also stores, in the selected language storage unit, a language selected by an operation accepted on the language selection screen.

18 Claims, 10 Drawing Sheets

ELECTRONIC APPARATUS CAPABLE OF CHANGING CONTENT DISPLAY LANGUAGE AND DISPLAY PROGRAM

INCORPORATION BY REFERENCE

This application is based upon and claims the benefit of priority from the corresponding Japanese Patent Application No. 2012-288192, filed in the Japan Patent Office on Dec. 28, 2012, the entire contents of which are incorporated herein by reference.

FIELD

The present disclosure relates to an electronic apparatus that can change the language in which content is displayed on a display unit.

BACKGROUND

A typical electronic apparatus displays a language selection key used to select the language in which to display content on a liquid crystal operation panel as a display unit, on the liquid crystal operation panel as a touch switch.

On a typical image forming apparatus, text displayed on the language selection key, displayed on the liquid crystal operation panel, is the currently selected language. If a user cannot understand the currently selected language it is therefore difficult for the user to recognize the presence of the language selection key.

Another problem with the typical image forming apparatus is that since the area in which to display the language selection key needs to be allocated, the ranges of other display areas on the liquid crystal operation panel are accordingly narrowed.

SUMMARY

An electronic apparatus, in an embodiment of the present disclosure, includes a touch panel, a content storage unit, a selected language storage unit, a content display unit, and a language setting unit. The content storage unit stores the content to be displayed on the touch panel, in different languages. The selected language storage unit is configured to store a selected language. The content display unit is configured to display, on the touch panel, content corresponding to the selected language stored in the selected language storage unit, of pieces of content stored in the content storage unit in the languages. The language setting unit is configured to display a language selection screen on the touch panel if a particular operation is accepted in a non-explicit area other than an explicit area that is explicitly indicated as being ready for accepting an operation, the language selection screen being one of screens displayed on the touch panel. The language setting unit also is configured to store, in the selected language storage unit, a language selected by an operation accepted on the language selection screen displayed on the touch panel.

A non-transitory computer-readable recording medium, in an embodiment of the present disclosure, stores a display program executable by a computer in an electronic apparatus. The display program includes first to fifth program codes. The first program code causes the computer to store content to be displayed on a touch panel in a content storage unit in different languages. The second program code causes the computer to store a selected language in a selected language storage unit. The third program code causes the computer to display, on the touch panel, content corresponding to the selected language stored in the selected language storage unit, of pieces of content stored in the content storage unit in the languages. The fourth program code causes the computer to display a language selection screen on the touch panel if a particular operation is accepted in a non-explicit area other than an explicit area that is explicitly indicated as being ready for accepting an operation, the language selection screen being one of screens displayed on the touch panel. The fifth program code causes the computer to store, in the selected language storage unit, a language selected by an operation accepted on the language selection screen displayed on the touch panel.

A display method in an embodiment of the present disclosure includes: (i) storing content to be displayed on a touch panel in a content storage unit in different languages; (ii) storing a selected language in a selected language storage unit; (iii) displaying, via a content display unit, on the touch panel, content corresponding to the selected language stored in the selected language storage unit, of pieces of content stored in the content storage unit in the languages; (iv) displaying, via a language setting unit, a language selection screen on the touch panel if a particular operation is accepted in a non-explicit area other than an explicit area that is explicitly indicated as being ready for accepting an operation, the language selection screen being one of screens displayed on the touch panel; and (v) storing, via a language setting unit, in the selected language storage unit, a language selected by an operation accepted on the language selection screen displayed on the touch panel.

Additional features and advantages are described herein, and will be apparent from the following Detailed Description and the figures.

DETAILED DESCRIPTION

An embodiment of the present disclosure will be described with reference to the drawings.

First, the structure of a multi-function peripheral (MFP) will be described as an electronic apparatus in this embodiment.

Figure 1:
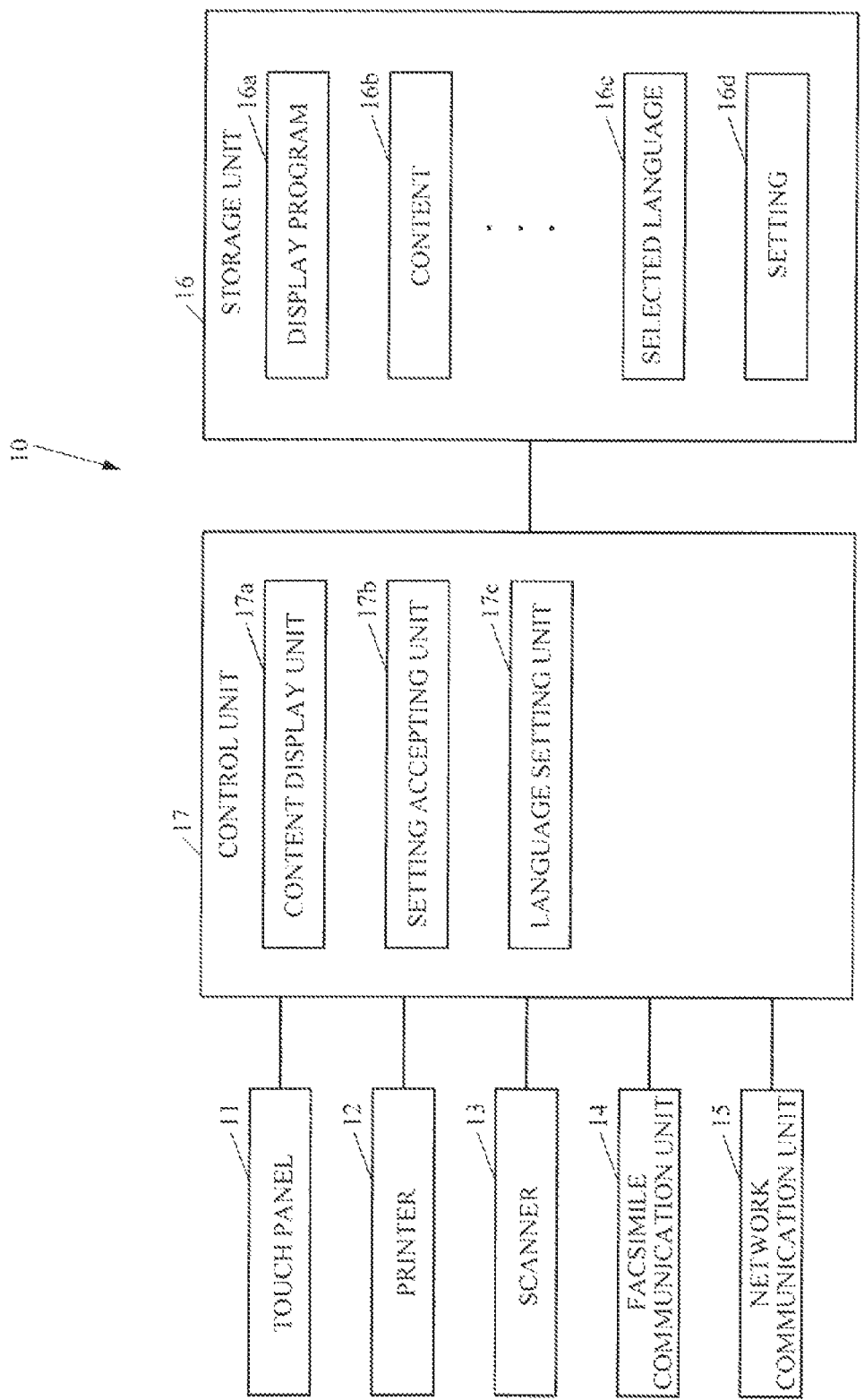
FIG. 1 illustrates a structure of a multi-function peripheral (MFP) in an embodiment of the present disclosure.

FIG. 1 illustrates the structure of the MFP 10 in this embodiment.

As illustrated in FIG. 1, the MFP 10 includes a touch panel 11 that functions both as a display unit on which information is displayed and an input unit that accepts an operation by a user, a printer 12 that prints an image on a recording medium such as a sheet, a scanner 13 that reads an image from an original, a facsimile communication unit 14 that carries out facsimile communication through a communication line such as a public telephone line, a network communication unit 15 that communicates through a local area network (LAN), the Internet, or another network, a storage unit 16 configured to function as a storage device such as an electrically erasable programmable read-only memory (EEPROM) or hard disk drive (HDD) in which various types of data is stored, and a control unit 17 that controls the whole of the MFP 10.

The storage unit 16 stores a display program 16a that controls a display on the touch panel 11. The display program 16a may be installed in the MFP 10 when the MFP 10 is manufactured, may be additionally installed in the MFP 10 from a universal serial bus (USB) memory, a secure digital (SD) card or another recording medium, or may be additionally installed in the MFP 10 through a network.

The storage unit 16 stores content 16b to be displayed on the touch panel 11 in each of the languages. The storage unit 16 is a storage unit in the present disclosure.

The storage unit 16 can also store a selected language 16c. The storage unit 16 is a selected language storage unit in the present disclosure.

The storage unit 16 can also store a setting 16d of an operation by which an item is selected from a language selection screen (the operation will be referred to below as the item specifying operation and a setting of it will be referred to below as the item specifying operation setting 16d).

The control unit 17 includes a central processing unit (CPU), a read-only memory (ROM) that stores programs and various types of data, and a random-access memory (RAM) that is used by the CPU as a working area. The CPU executes programs stored in the ROM or storage unit 16.

The control unit 17 functions as a content display unit 17a that executes the display program 16a stored in the storage unit 16 so that the content 16b corresponding to the selected language 16c is displayed on the touch panel 11, an operation method setting accepting unit 17b that accepts a setting of an item specifying operation, and a language setting unit 17c that stores a language selected by an operation made on the touch panel 11 in the storage unit 16.

Next, an operation of the MFP 10 will be described.

First, an operation of the content display unit 17a of the control unit 17 included in the MFP 10 will be described.

Figure 2:
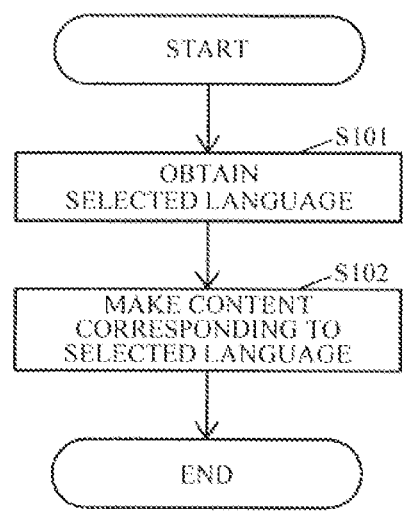
FIG. 2 illustrates an operation of a content display unit indicated in FIG. 1.

When the MFP 10 is started, or a selected language is changed as described later, the content display unit 17a operates as illustrated in FIG. 2.

FIG. 2 illustrates an operation of the content display unit 17a.

As illustrated in FIG. 2, the content display unit 17a obtains the selected language 16c stored in the storage unit 16 (S101).

Of pieces of content 16b stored in the storage unit 16 in the languages, the content display unit 17a then makes the content 16b corresponding to the selected language 16c obtained in S101 ready to use (S102), terminating the operation in FIG. 2.

Upon completion of the operation in FIG. 2, the content display unit 17a displays the content 16b corresponding to the selected language 16c, the content 16b having been made ready to use in S102, on the touch panel 11 according to, for example, an operation made on the touch panel 11 or the situation of an operation of the MFP 10.

Next, an operation of the operation method setting accepting unit 17b of the control unit 17 included in the MFP 10 will be described.

Figure 3:
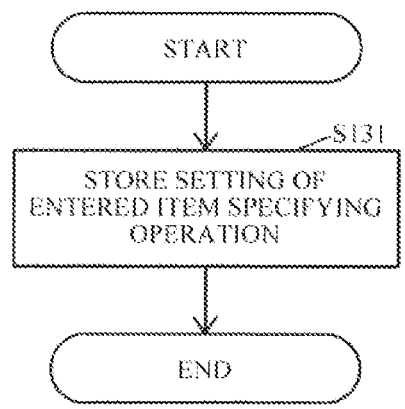
FIG. 3 illustrates an operation of an operation method setting unit indicated in FIG. 1.

If a command to set an item specifying operation is entered through the touch panel 11, the operation method setting accepting unit 17b operates as illustrated in FIG. 3.

FIG. 3 illustrates an operation of the operation method setting accepting unit 17b.

As illustrated in FIG. 3, the operation method setting accepting unit 17b stores the setting of the entered item specifying operation in the storage unit 16 as the item specifying operation setting 16d (S131), terminating the operation in FIG. 3.

Operations used to set an item on the language selection screen include a slide wherein a portion of the touch panel 11 is touched and moved, and a tap wherein the touch panel 11 is not touched and then the touch panel 11 is touched for a moment. That is, any one of a slide and a tap is stored as the setting 16d.

Next, an operation of the language setting unit 17c of the control unit 17 included in the MFP 10 will be described.

Figure 4:
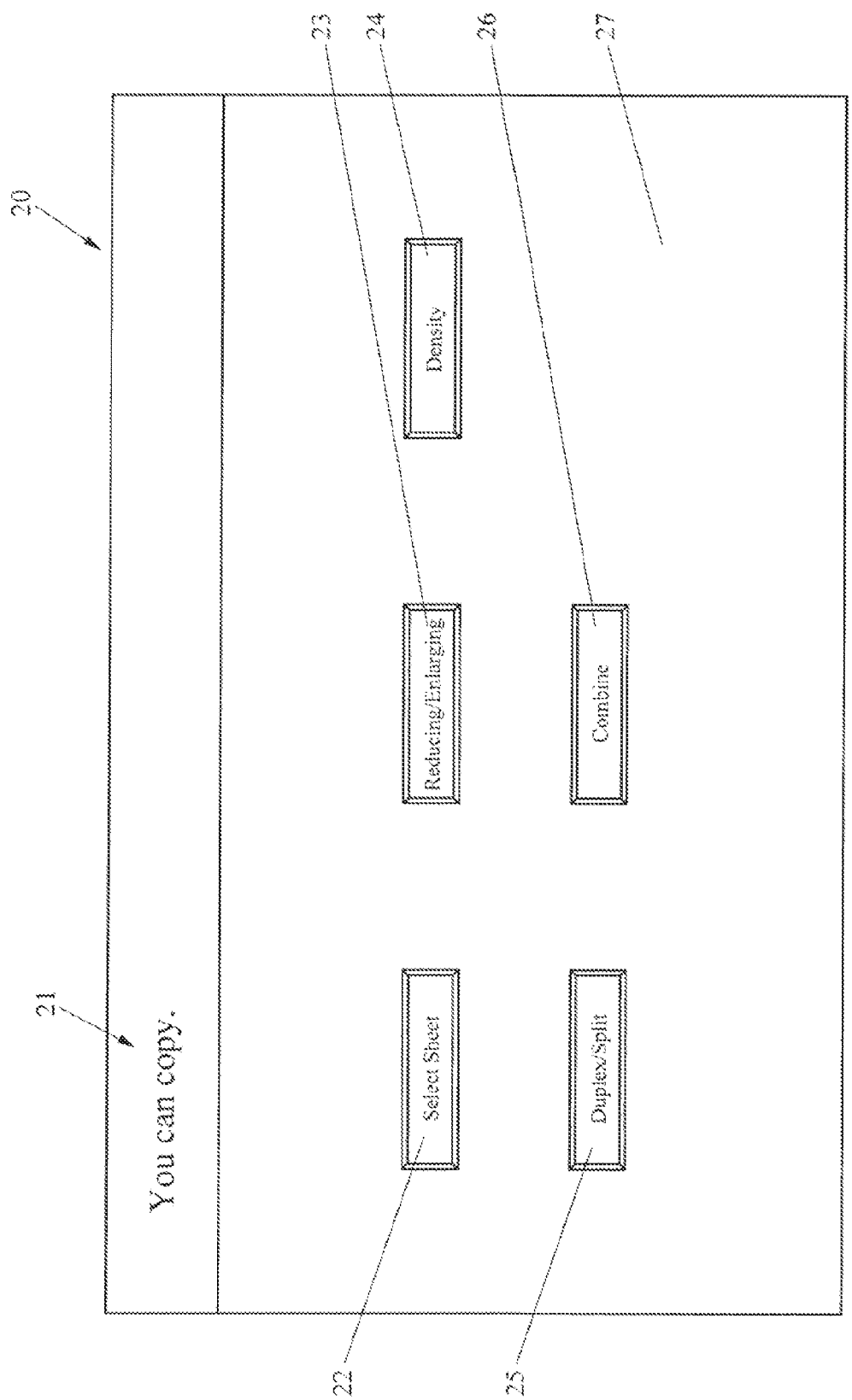
FIG. 4 illustrates an example of a screen that has been displayed on a touch panel before a language selection screen is displayed.

FIG. 4 illustrates an example of a screen 20 that is displayed on the touch panel 11 before the language selection screen is displayed.

The screen 20 in FIG. 4 includes a message 21 indicating that a copy can be made, a button 22 that specifies a size of a sheet on which printing is performed, a button 23 that specifies a size after printing with respect to the size of the original, a button 24 that specifies a printing density, a button 25 that specifies a setting to make a double-sided copy from single-sided originals or a double-sided original and a setting to make single-sided copies one page at a time from a double-sided original or a double-page spread, a button 26 that specifies a setting to copy a plurality of originals on a single sheet, and a blank area 27.

In FIG. 4, the text of the message 21 and text on the buttons 22 to 26 are displayed in Japanese. That is, the selected language 16c stored in the storage unit 16 is Japanese.

On the screen 20 in FIG. 4, the areas in which the buttons 22 to 26 are displayed are areas that are explicitly indicated as being ready for accepting an operation; each of these areas is an explicit area in the present disclosure. The blank area 27 is an area that is not explicitly indicated as being ready for accepting an operation; the area is a non-explicit area in the present disclosure.

Figure 5:
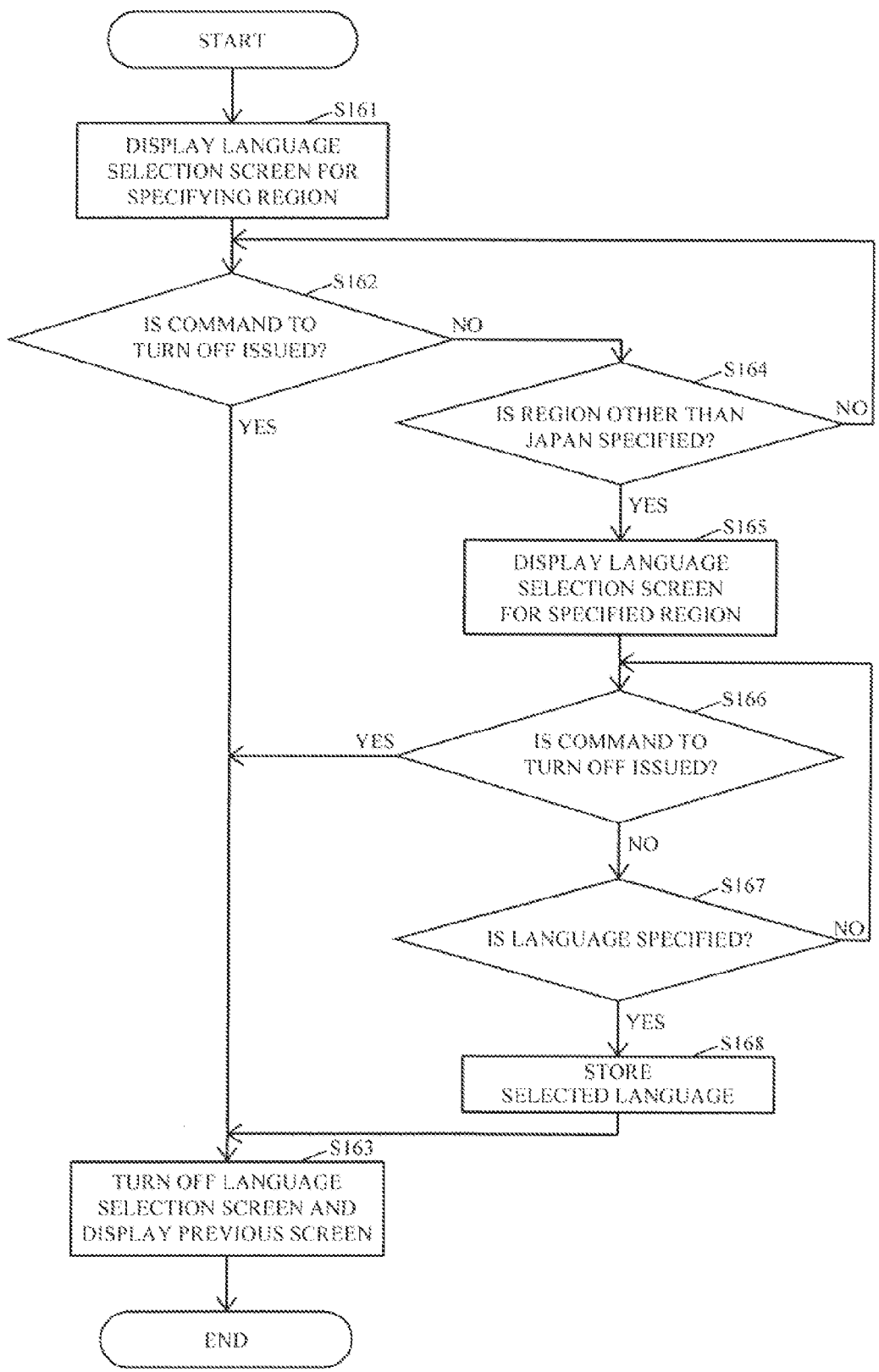
FIG. 5 shows an operation of a language setting unit indicated in FIG. 1.

If a press-and-hold operation, as a particular operation, in which a portion touched on the touch panel 11 is touched for a length of time is made in the blank area 27 with the screen 20 in FIG. 4 displayed on the touch panel 11, the language setting unit 17c in the control unit 17 starts the operation illustrated in FIG. 5.

FIG. 5 illustrates an operation of the language setting unit 17c.

Figure 6:
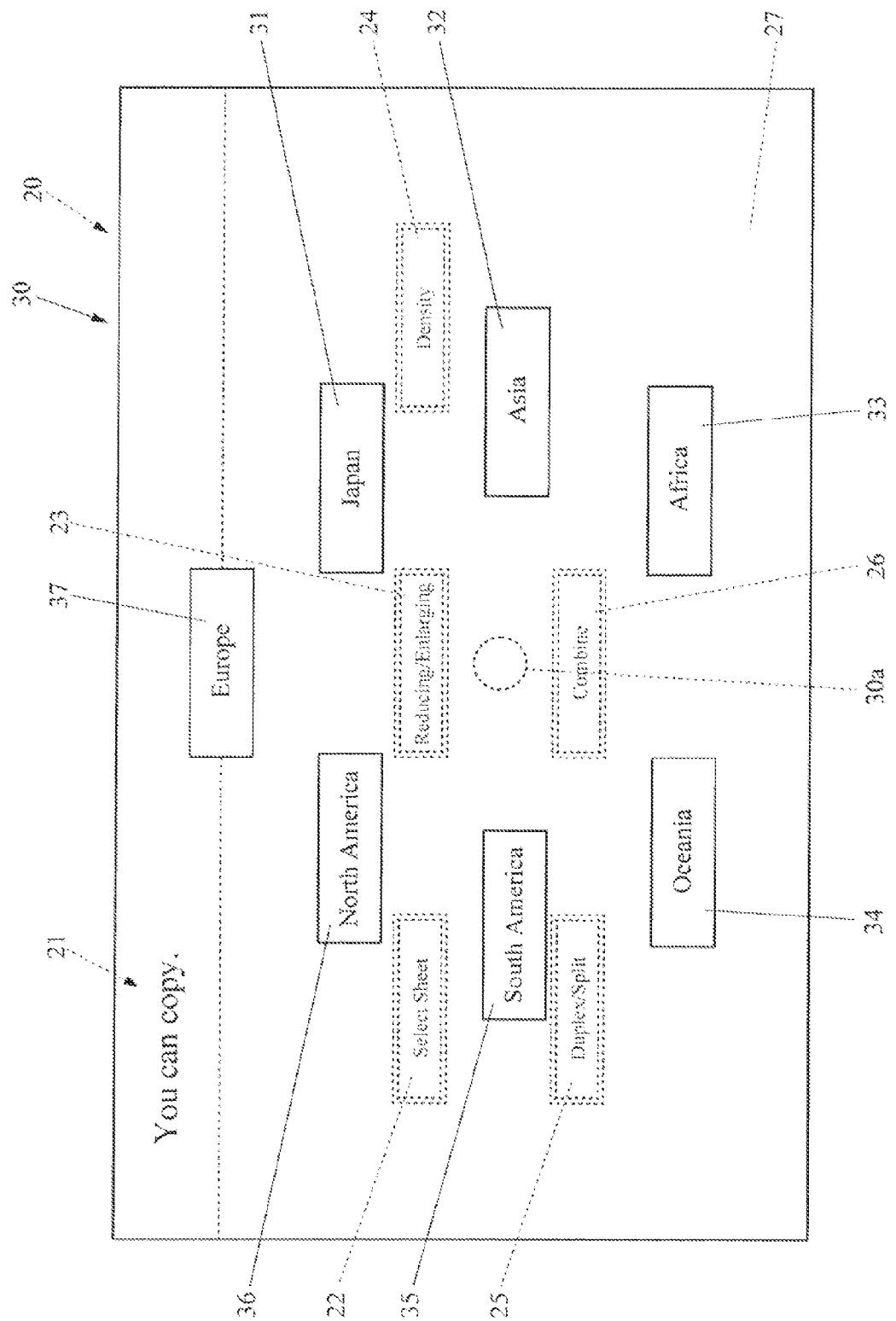
FIG. 6 illustrates an example of a language selection screen for specifying a region.

As illustrated in FIG. 5, the language setting unit 17c displays on the touch panel 11 a language selection screen 30, as illustrated in FIG. 6, on which a region is specified (S161).

FIG. 6 illustrates an example of the language selection screen 30 for specifying a region, the language selection screen 30 being displayed on the touch panel 11.

The screen 20 in FIG. 4 is grayed out, on which the language selection screen 30 in FIG. 6 is displayed. On the language selection screen 30, items are displayed corresponding to the regions of the world. That is, the language selection screen 30 includes an area 31 as an explicit area for an item corresponding to Japan, an area 32 as an explicit area for an item corresponding to Asia, an area 33 as an explicit area for an item corresponding to Africa, an area 34 as an explicit area for an item corresponding to Oceania, an area 35 as an explicit area for an item corresponding to South America, an area 36, which is an explicit area for an item corresponding to North America, and an area 37 as an explicit area for an item corresponding to Europe.

Although, in this embodiment, explicit areas for the items corresponding to each of the regions in the world are displayed in the form of rectangular areas on the language selection screen 30, these explicit areas may be displayed in the same shape as shown on a map.

As illustrated in FIG. 5, after the processing in S161, the language setting unit 17c determines whether a command to turn off the language selection screen 30 has been issued (S162).

Since the press-and-hold operation, as the particular operation, is made in the blank area 27 to display the language selection screen 30 on the touch panel 11, the touch portion on the touch panel 11 is present at a point in time at which the language selection screen 30 is displayed on the touch panel 11. If this touched portion disappears, that is, if an operation to cancel the state in which the touch panel 11 is touched is accepted, the language setting unit 17c determines in S162 that a command to turn off the language selection screen 30 has been issued.

If Japan is specified, the language setting unit 17c also determines in S162 that a command to turn off the language selection screen 30 has been issued. If the touched portion is slid and reaches the area 31, the language setting unit 17c determines that Japan has been specified. The reason why a decision as to whether Japan has been specified is made, is that the selected language 16c stored in the storage unit 16 is Japanese.

If the language setting unit 17c determines in S162 that a command to turn off the language selection screen 30 has been issued, the language setting unit 17c turns off the language selection screen 30 displayed on the touch panel 11 and displays the previous screen 20 (see FIG. 4) on the touch panel 11 (S163), terminating the operation in FIG. 5.

If the language setting unit 17c determines in S162 that a command to turn off the language selection screen 30 has not been issued, the language setting unit 17c determines whether a region other than Japan has been specified (S164).

Since the press-and-hold operation, as the particular operation, is made in the blank area 27 to display the language selection screen 30 on the touch panel 11, the touch portion on the touch panel 11 is present at a point in time at which the language selection screen 30 is displayed on the touch panel 11, as described above. Now, the touched portion is assumed to be, for example, a portion 30a illustrated in FIG. 6. If the touched portion is slid from the portion 30a and reaches any one of the regions 32 to 37, the language setting unit 17c determines in S164 that a region other than Japan has been specified.

If the language setting unit 17c determines in S164 that a region other than Japan has not been specified, the language setting unit 17c returns to the processing in S162.

Figure 7:
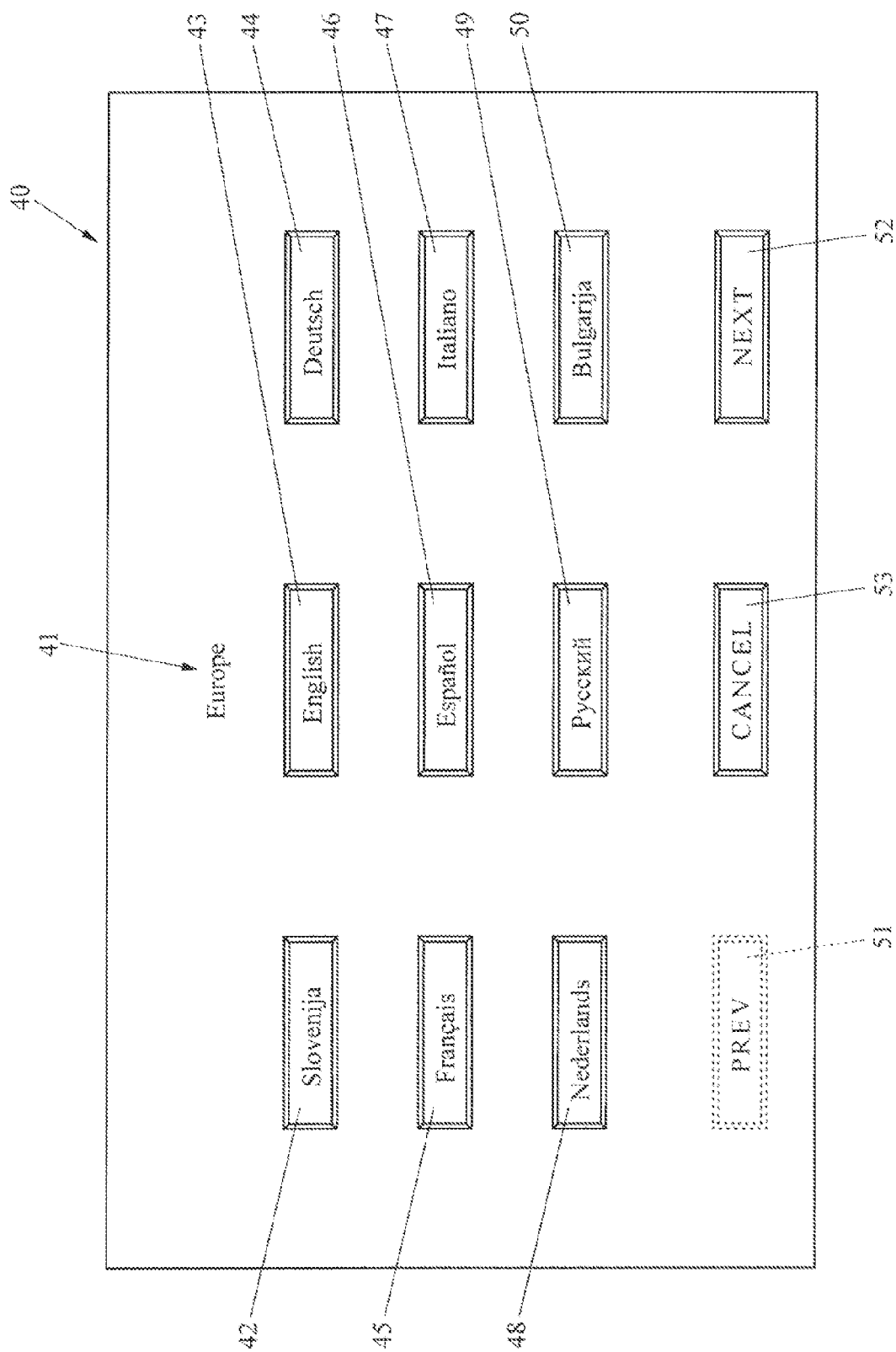
FIG. 7 illustrates an example of a language selection screen for a specified region.

If the language setting unit 17c determines in S164 that a region other than Japan has been specified, the language setting unit 17c displays a language selection screen 40, as illustrated in FIG. 7, for a specified region on the touch panel 11 (S165)

FIG. 7 illustrates an example of the language selection screen 40, for a specified region, displayed on the touch panel 11.

The language selection screen 40 illustrated in FIG. 7 is an example of the language selection screen 40 for Europe that is displayed when the touched portion reaches the area 37 on the language selection screen 30 in FIG. 6. The language selection screen 40 includes text 41 indicating that this screen is intended for Europe, buttons 42 to 50 as explicit areas for items corresponding to each of languages in Europe, a button 51 used to return to a previous page when there are too many languages to fit on a single page, a button 52 used to proceed to a next page when there are too many languages to fit on a single page, and a button 53 used to turn off the language selection screen 40. In the example in FIG. 7, since the displayed page is the first page, the button 51 is grayed out. To indicate that this screen is intended for Europe, a map may be displayed instead of the text 41.

Referring again to FIG. 5, after the processing in S165, the language setting unit 17c determines whether a command to turn off the language selection screen 40 has been issued (S166). If the button 53 is tapped, the language setting unit 17c determines in S166 that a command to turn off the language selection screen 40 has been issued.

If the language setting unit 17c determines in S166 that a command to turn off the language selection screen 40 has been issued, the language setting unit 17c turns off the language selection screen 40 displayed on the touch panel 11 and displays the previous screen 20 (see FIG. 4) on the touch panel 11 (S163), terminating the operation in FIG. 5.

If the language setting unit 17c determines in S166 that a command to turn off the language selection screen 40 has not been issued, the language setting unit 17c determines whether a language has been specified (S167). If any one of the buttons 42 to 50 has been tapped, the language setting unit 17c determines in S167 that a language has been selected.

If the language setting unit 17c determines in S167 that a language has not been specified, the language setting unit 17c returns to the processing in S166.

If the language setting unit 17c determines in S167 that a language has been specified, the language setting unit 17c stores the selected language in the storage unit 16 as the selected language 16c (S168). That is, the language setting unit 17c changes the selected language.

The language setting unit 17c then turns off the language selection screen 40 displayed on the touch panel 11 and displays the previous screen 20 (see FIG. 4) on the touch panel 11 (S163), terminating the operation in FIG. 5. At that time, text of the message 21 and text on the button 22 to 26 on the screen 20 are displayed in the new language, that was changed in S168 by the processing performed by the content display unit 17a as illustrated in FIG. 2.

As described above, with the MFP 10, the language selection screen 30 (see FIG. 6) is displayed on the touch panel 11 by the press-and-hold operation into the blank area 27 on the screen 20 (see FIG. 4) displayed on the touch panel 11 as a particular operation. Accordingly, the language in which to display content on the touch panel 11 can be easily changed in a short time. The screen 20 is only an example. That is, the MFP 10 enables the language selection screen 30 to be easily displayed on the touch panel 11 from any screen, as with the screen 20.

Image forming apparatuses such as MFPs are electronic apparatuses that can be shared by a plurality of users, so these apparatuses are highly likely to be shared by a plurality of users who use different languages. Therefore, the MFP 10 is very advantageous in that the language in which content is displayed on the touch panel 11 can be easily changed.

To display the language selection screen 30 on the touch panel 11, the particular operation can be made in the blank area 27 instead of an explicit area such as a button. Therefore, it is not necessary to allocate an area in which the particular operation is enabled to display the language selection screen 30 on the touch panel 11, so the MFP 10 can prevent a reduction in a display range in which content is displayed on the touch panel 11. This can improve the visibility of content displayed on the touch panel 11. In addition, the MFP 10 does not need a design change in the screen 20 to, for example, allocate a new button used to display the language selection screen 30.

A particular operation in the blank area 27 to display the language selection screen 30 on the touch panel 11 may be the press-and-hold operation. This can prevent the language selection screen 30 from being displayed on the touch panel 11 when the user by mistake only touches the blank area 27. Alternatively, this particular operation in the blank area 27 may not be an operation other than the press-and-hold operation. An example of a particular operation in the blank area 27 to display the language selection screen 30 on the touch panel 11 may be simply a tap or a double tap that is an operation to tap twice in succession.

If an operation to cancel a state in which the touch panel 11 is touched is accepted, the MFP 10 may turn off the language selection screen 30 displayed on the touch panel 11. This simplifies an operation to turn off the language selection screen 30 displayed on the touch panel 11.

After the language selection screen 30 displayed on the touch panel 11 has been turned off (that is, after the processing in S163), the MFP 10 may take over the screen 20 that had been displayed on the touch panel 11 to processing before the language selection screen 30 is displayed on the touch panel 11 (that is, before the processing in S161). This can prevent maneuverability from being lowered after the language selection screen 30 has been turned off.

The MFP 10 may accept a setting as to whether an operation to specify an item on the language selection screen 30 is a slide or a tap (S131). Therefore, an operation to specify an item on the language selection screen 30 can be changed according to the desire of the user. Therefore, although an operation to specify an item on the language selection screen 30 has been described as a slide, the language setting unit 17c may display the language selection screen 30 intended for tapping, as illustrated in FIG. 8, on the touch panel 11 in S161 if a tap is set as an operation to specify an item on the language selection screen 30.

Figure 8:
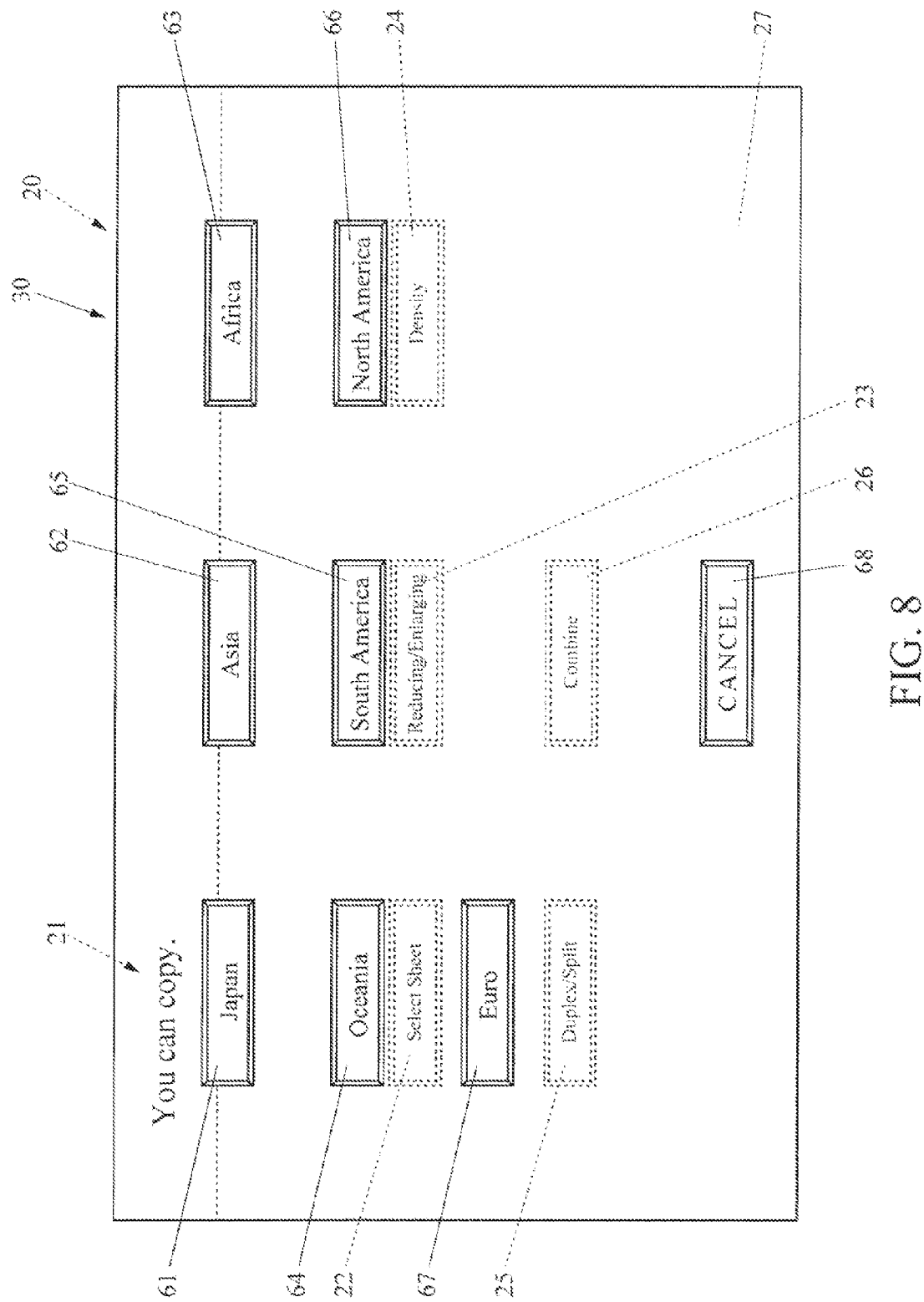
FIG. 8 illustrates an example of another language selection screen for specifying a region.

FIG. 8 illustrates a different example of the language selection screen 30 for specifying a region from the example in FIG. 6, the language selection screen 30 being displayed on the touch panel 11.

In FIG. 8, the screen 20 illustrated in FIG. 4 is grayed out and the language selection screen 30 is displayed on the grayed-out screen 20. The language selection screen 30 includes buttons 61 to 67 as explicit areas for items correspondence to each of the regions of the world, and a button 68 used to turn off the language selection screen 30. The buttons 61 to 67 have the same functions as the areas 31 to 37 in FIG. 6. If the button 61 or button 68 is tapped, the language setting unit 17c determines in S162 that a command to turn off the language selection screen 30 has been issued.

The MFP 10 may also accept a setting as to whether an operation to specify an item on the language selection screen 40 is a slide or a tap (S131). Therefore, an operation to specify an item on the language selection screen 40 can be changed according to the desire of the user. Therefore, although an operation to specify an item on the language selection screen 40 has been described as a tap, the language setting unit 17c may display the language selection screen 40 intended for sliding, as illustrated in FIG. 9, on the touch panel 11 in S165 if a slide is set as a operation to specify an item on the language selection screen 40.

Figure 9:
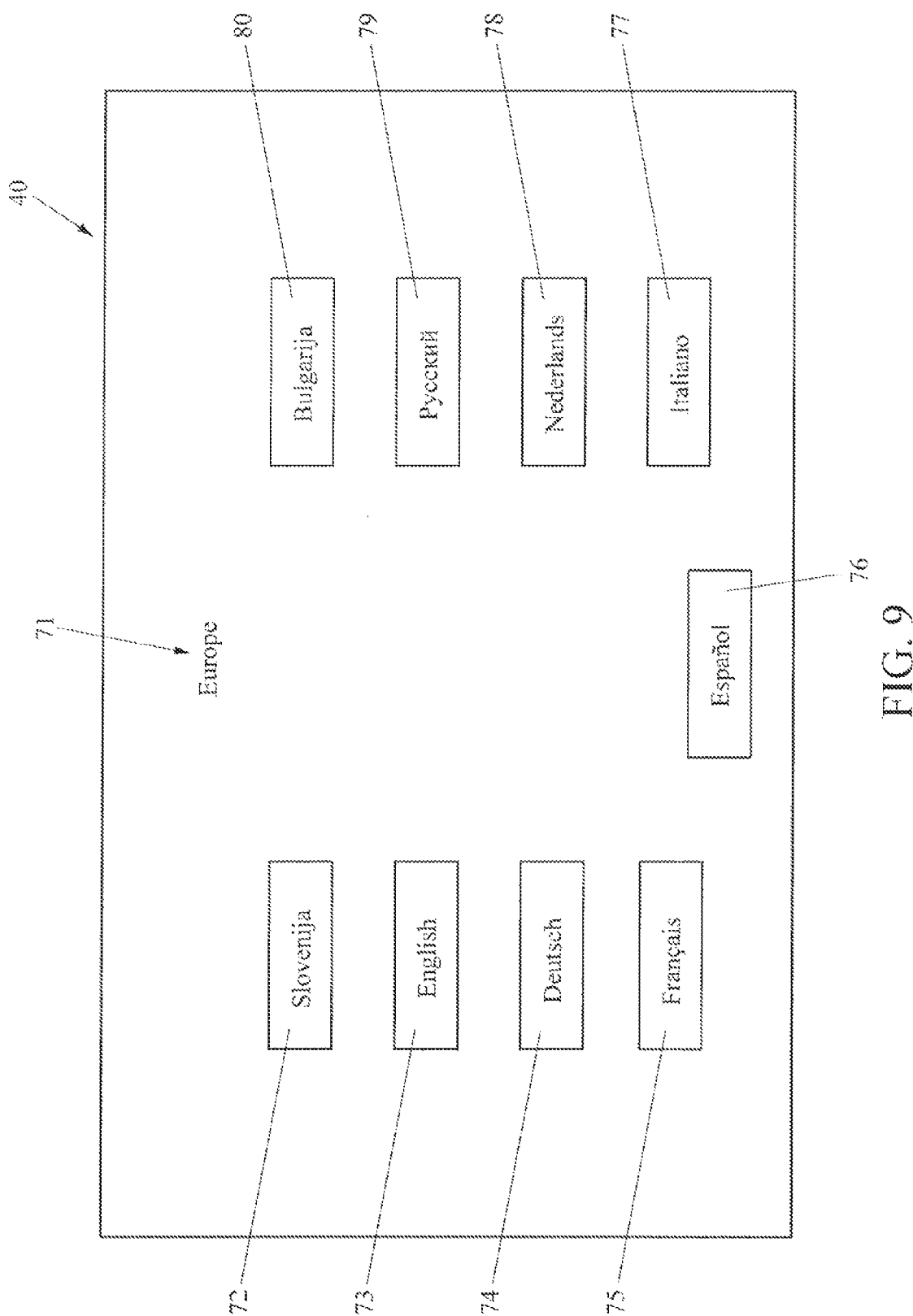
FIG. 9 illustrates an example of another language selection screen for a specified region.

FIG. 9 illustrates a different example of the language selection screen 40 for a specified region from the example in FIG. 7, the language selection screen 40 being displayed on the touch panel 11.

The language selection screen 40 illustrated in FIG. 9 is an example of the language selection screen 40 for Europe. The language selection screen 40 includes text 71 indicating that this screen is intended for Europe and areas 72 to 80 as explicit areas for items corresponding to each of languages in Europe. The areas 72 to 80 have the same functions as the buttons 42 to 50 in FIG. 7. If an operation to cancel the state in which the touch panel 11 is touched is accepted, the language setting unit 17c determines in S166 that a command to turn off the language selection screen 40 has been issued.

Figure 10:
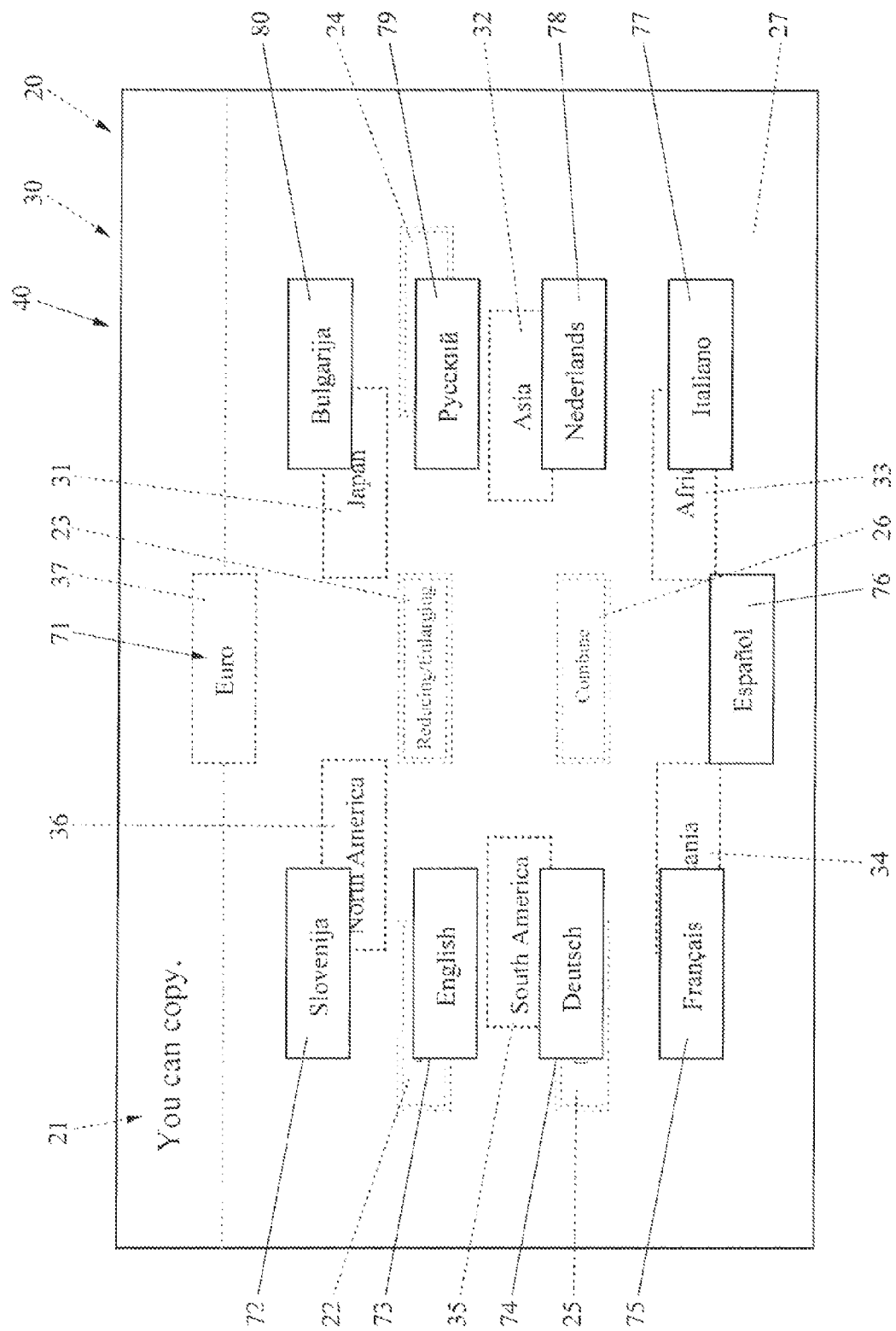
FIG. 10 illustrates an example of another language selection screen for a specified region.

If the language selection screen 30 and language selection screen 40 are both intended for sliding, the MFP 10 enables the user to specify an item on the language selection screen 30 and an item on the language selection screen 40 by a slide in succession. If the language selection screen 30 and language selection screen 40 are both intended for sliding, the MFP 10 may display the language selection screen 40 on the grayed-out language selection screen 30 as illustrated in FIG. 10. In this case, the MFP 10 can display, on the language selection screen 40, an operation history of the user on the language selection screen 30.

The MFP 10 in this embodiment is structured so that if it is determined in S166 that a command to turn off the language selection screen 40 has been issued, the previous screen 20 is displayed on the touch panel 11 by turning off the language selection screen 40 displayed on the touch panel 11 (S163), terminating the operation illustrated in FIG. 5. However, the MFP 10 may be structured so that if it is determined in S166 that a command to turn off the language selection screen 40 on the touch panel 11 has been issued, the language selection screen 30 is displayed again on the touch panel 11 by turning off the language selection screen 40 (S161).

Even if there are many selectable languages, the MFP 10 can restrict languages by region (S165). Accordingly, the user can easily search for the desired language when compared with a situation in which items corresponding to all languages are displayed on the touch panel 11 at a time.

The MFP 10 may also be structured so that if a particular operation is accepted in the blank area 27 with the screen 20 in FIG. 4 displayed on the touch panel 11, a selection screen on which explicit areas for the items corresponding to each of the languages is displayed directly on the touch panel 11 without passing through the language selection screen 30 on which a region is selected.

Although, in this embodiment, the electronic apparatus in the present disclosure is an MFP, the electronic apparatus may be an image forming apparatus other than an MFP. Alternatively, the electronic apparatus may be an electronic apparatus other than an image forming apparatus, such as a personal computer (PC).

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An electric apparatus comprising:
   a touch panel;
   a content storage unit that stores content to be displayed on the touch panel in different languages;
   a selected language storage unit that stores a selected language;
   a content display unit that displays, on the touch panel, content corresponding to the selected language stored in the selected language storage unit, of pieces of content stored in the content storage unit in the languages; and
   a language setting unit that
      displays a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel,
      specifies an item if a portion touched on the touch panel reaches an explicit area on the first language selection screen by moving the portion touched on the touch panel,
      displays a second language selection screen including items corresponding to each of the languages corresponding to the specified item on the first language selection screen,
      specifies an item if a portion touched on the touch panel reaches an explicit area on the second language selection screen by moving the portion touched on the touch panel, and
      stores, in the selected language storage unit, a language corresponding to the specified item on the second language selection screen,
   wherein after the first or second language selection screen has been displayed on the touch panel, if an operation to cancel a state in which the touch panel is touched is accepted before the portion touched on the touch panel reaches the explicit area on the first or second language selection screen, the language setting unit turns off the first or second language selection screen displayed on the touch panel.

2. The electric apparatus according to claim 1, wherein the particular operation is to continue to touch a portion touched on the touch panel.

3. The electric apparatus according to claim 1, wherein if the language setting unit turns off the first or second language selection screen, the language setting unit displays, on the touch panel, a screen that had been displayed on the touch panel before the first or second language selection screen has been displayed.

4. The electric apparatus according to claim 1, comprising an operation method setting accepting unit that accepts a setting as to whether an operation to specify an item on the first or second language selection screen is an operation to move the portion touched on the touch panel or an operation to change a state in which the touch panel is not touched to a state in which the touch panel is touched for a moment.

5. A non-transitory computer-readable recording medium that stores a display program executable by a computer in an electronic apparatus, the display program comprising:
   first program code that causes the computer to store content to be displayed on a touch panel in a content storage unit in different languages;
   second program code that causes the computer to store a selected language in a selected language storage unit;
   third program code that causes the computer to display, on the touch panel, content corresponding to the selected language stored in the selected language storage unit, of pieces of content stored in the content storage unit in the languages;
   fourth program code that causes the computer to display a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel;
   fifth program code that causes the computer to specify an item if a portion touched on the touch panel reaches an explicit area on the first language selection screen by moving the portion touched on the touch panel;
   sixth program code that causes the computer to display a second language selection screen including items corresponding to each of the languages corresponding to the specified item on the first language selection screen;
   seventh program code that causes the computer to specify an item if a portion touched on the touch panel reaches an explicit area on the second language selection screen by moving the portion touched on the touch panel;
   eighth program code that causes the computer to store, in the selected language storage unit, a language corresponding to the specified item on the second language selection screen; and
   ninth program code that causes the computer to turn off the first or second language selection screen displayed on the touch panel, after the first or second language selection screen has been displayed on the touch panel, if an operation to cancel a state in which the touch panel is touched is accepted before the portion touched on the touch panel reaches the explicit area on the first or second language selection screen.

6. A display method comprising:
   storing content to be displayed on a touch panel in a content storage unit in different languages;
   storing a selected language in a selected language storage unit;
   displaying, via a content display unit, on the touch panel, content corresponding to the selected language stored in the selected language storage unit, of pieces of content stored in the content storage unit in the languages;
   displaying, via a language setting unit, a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel;
   specifying, via the language setting unit, an item if a portion touched on the touch panel reaches an explicit area on the first language selection screen by moving the portion touched on the touch panel;
   displaying, via the language setting unit, a second language selection screen including items corresponding to each of the languages corresponding to the specified item on the first language selection screen;
   specifying, via the language setting unit, an item if a portion touched on the touch panel reaches an explicit area on the second language selection screen by moving the portion touched on the touch panel;

storing, via the language setting unit, in the selected language storage unit, a language corresponding to the specified item on the second language selection screen; and after the first or second language selection screen has been displayed on the touch panel, if an operation to cancel a state in which the touch panel is touched is accepted before the portion touched on the touch panel reaches the explicit area on the first or second language selection screen, turning off the first or second language selection screen displayed on the touch panel.

7. The electric apparatus according to claim 1, wherein when displaying the second language screen on the touch panel, the language setting unit grays out one or more items on the first language selection screen other than the specified item.

8. The electric apparatus according to claim 7, wherein when displaying at least one of the first language selection screen and the second language selection screen on the touch panel, the language setting unit grays out a screen that had been displayed on the touch panel before the first language selection screen has been displayed.

9. The non-transitory computer-readable recording medium according to claim 5, the display program further comprising tenth program code that causes, when displaying the second language screen on the touch panel, the computer to gray out one or more items on the first language selection screen other than the specified item.

10. The non-transitory computer-readable recording medium according to claim 9, the display program further comprising eleventh program code that causes, when displaying at least one of the first language selection screen and the second language selection screen on the touch panel, the computer to gray out a screen that had been displayed on the touch panel before the first language selection screen has been displayed.

11. The display method according to claim 6 further comprising, when displaying the second language screen on the touch panel, graying out one or more items on the first language selection screen other than the specified item.

12. The display method according to claim 11 further comprising, when displaying at least one of the first language selection screen and the second language selection screen on the touch panel, graying out a screen that had been displayed on the touch panel before the first language selection screen has been displayed.

13. An electric apparatus comprising:
a touch panel;
a content storage unit that stores content to be displayed on the touch panel in different languages;
a selected language storage unit that stores a selected language;
a content display unit that displays, on the touch panel, content corresponding to the selected language stored in the selected language storage unit, of pieces of content stored in the content storage unit in the languages; and
a language setting unit that
  displays a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel,
  when any one of the items is specified out of the items on the first selection screen, displays a second language selection screen including a region corresponding to the specified item and items corresponding to each of the languages corresponding to the specified item and grays out one or more items on the first language selection screen other than the specified item, and
  stores, in the selected language storage unit, a language selected by an operation accepted on the second language selection screen displayed on the touch panel.

14. The electric apparatus according to claim 13, wherein when displaying at least one of the first language selection screen and the second language selection screen on the touch panel, the language setting unit grays out a screen that had been displayed on the touch panel before the first language selection screen has been displayed.

15. A non-transitory computer-readable recording medium that stores a display program executable by a computer in an electronic apparatus, the display program comprising:
first program code that causes the computer to store content to be displayed on a touch panel in a content storage unit in different languages;
second program code that causes the computer to store a selected language in a selected language storage unit;
third program code that causes the computer to display, on the touch panel, content corresponding to the selected language stored in the selected language storage unit, of pieces of content stored in the content storage unit in the languages;
fourth program code that causes the computer to display a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel;
fifth program code that causes, when any one of the items is specified out of the items on the first selection screen, the computer to display a second language selection screen including a region corresponding to the specified item and items corresponding to each of the languages corresponding to the specified item and gray out one or more items on the first language selection screen other than the specified item; and
sixth program code that causes the computer to store, in the selected language storage unit, a language selected by an operation accepted on the second language selection screen displayed on the touch panel.

16. The non-transitory computer-readable recording medium according to claim 15, the display program further comprising seventh program code that causes, when displaying at least one of the first language selection screen and the second language selection screen on the touch panel, the computer to gray out a screen that had been displayed on the touch panel before the first language selection screen has been displayed.

17. A display method comprising:
storing content to be displayed on a touch panel in a content storage unit in different languages;
storing a selected language in a selected language storage unit;
displaying, via a content display unit, on the touch panel, content corresponding to the selected language stored in the selected language storage unit, of pieces of content stored in the content storage unit in the languages;
displaying, via a language setting unit, a first language selection screen including items corresponding to regions of the world on the touch panel if a particular operation is accepted in a non-explicit area other than an explicit area that is explicitly indicated as being ready for accepting an operation, the first language selection screen being one of screens displayed on the touch panel;

when any one of the items is specified out of the items on the first selection screen, displaying, via the language setting unit, a second language selection screen including a region corresponding to the specified item and items corresponding to each of the languages corresponding to the specified item and graying out, via the language setting unit, one or more items on the first language selection screen other than the specified item;

storing, in the selected language storage unit, a language selected by an operation accepted on the second language selection screen displayed on the touch panel.

18. The display method according to claim 17 further comprising, when displaying at least one of the first language selection screen and the second language selection screen on the touch panel, graying out, via the language setting unit, a screen that had been displayed on the touch panel before the first language selection screen has been displayed.

\* \* \* \* \*